United States Patent [19]
Holler

[11] Patent Number: 5,655,462
[45] Date of Patent: Aug. 12, 1997

[54] APPARATUS AND METHOD FOR FASTENING A SECURITY COVER ONTO A DISPLAY CASE

[76] Inventor: John L. Holler, 30237 Sherri Lee Dr., Bulverde, Tex. 78163

[21] Appl. No.: 489,652

[22] Filed: Jun. 12, 1995

Related U.S. Application Data

[63] Continuation-in-part of Ser. No. 401,275, Mar. 9, 1995.

[51] Int. Cl.$^6$ ............................................. E06B 9/00
[52] U.S. Cl. .................. 109/49.5; 52/202; 49/409; 403/381; 312/114; 312/137; 312/210; 312/262
[58] Field of Search ............... 109/49.5, 78; 206/44 R, 206/45.31; 312/114, 137, 210, 258, 262, 297; 52/714, 107, 200–202; 49/409; 403/381

[56] References Cited

U.S. PATENT DOCUMENTS

| | | | |
|---|---|---|---|
| 120,874 | 11/1871 | Holmes et al. | |
| 917,705 | 4/1909 | Benjamin | |
| 1,095,484 | 5/1914 | Wright | |
| 1,255,407 | 2/1918 | Goetz | |
| 1,572,429 | 2/1926 | Grither, Jr. | |
| 1,920,882 | 8/1933 | Pellow | 312/114 |
| 2,326,713 | 8/1943 | Wesseler | 89/36 |
| 2,515,466 | 7/1950 | Nahmens | 45/68.3 |
| 2,589,699 | 3/1952 | Johnson | 312/204 |
| 2,605,617 | 8/1952 | Replogle | 62/89 |
| 2,677,588 | 5/1954 | Couse | 312/258 |
| 2,717,018 | 9/1955 | Wagner | 150/52 |
| 2,865,569 | 12/1958 | Levenberg | 237/79 |
| 2,943,901 | 7/1960 | Eaton et al. | 312/229 |
| 3,116,097 | 12/1963 | Novales | 312/297 |
| 3,120,076 | 2/1964 | Zuch | 45/68 |
| 3,239,891 | 3/1966 | Gardner | 49/409 |
| 3,241,899 | 3/1966 | Donker | 312/116 |
| 3,434,769 | 3/1969 | Salet | 312/258 |
| 3,805,816 | 4/1974 | Nolte | 160/327 X |
| 3,855,898 | 12/1974 | McDonald | 109/49.5 X |
| 4,011,943 | 3/1977 | Galli et al. | 206/44 R |
| 4,104,829 | 8/1978 | Agcaoili | 49/409 |
| 4,128,285 | 12/1978 | Lore et al. | 312/196 |
| 4,280,414 | 7/1981 | Allshouse et al. | 109/49.5 |
| 4,285,558 | 8/1981 | Medford | 312/278 |
| 4,345,635 | 8/1982 | Solomon | 160/133 |
| 4,452,020 | 6/1984 | Werner | 52/202 |
| 4,454,691 | 6/1984 | Mitchell | 52/202 |
| 4,560,214 | 12/1985 | Otema | 312/114 |
| 4,581,865 | 4/1986 | Miller | 52/202 |
| 4,605,267 | 8/1986 | Rinkewich | 312/297 |
| 4,616,951 | 10/1986 | Maatela | 403/381 X |
| 4,633,614 | 1/1987 | Van Weelden | 49/409 |
| 4,733,510 | 3/1988 | Werner | 52/202 |
| 4,804,877 | 2/1989 | Harwood | 312/114 |
| 5,161,330 | 11/1992 | Penczak | 52/714 X |
| 5,253,457 | 10/1993 | Orth | 52/202 |
| 5,383,312 | 1/1995 | St. Louis et al. | 52/202 X |

FOREIGN PATENT DOCUMENTS

| | | | |
|---|---|---|---|
| 2 516 281 | 5/1983 | France | |
| 1803365 | 6/1969 | Germany | 403/381 |

*Primary Examiner*—Suzanne Dino
*Attorney, Agent, or Firm*—Thorpe, North & Western

[57] ABSTRACT

An apparatus for securing a free edge of a security cover relative to a free edge of a finery case containing jewelry, precious metals and the like. The apparatus includes an elongate coupling member having first and second open channels formed therein. The free edge of the security cover is fastened within the first open channel. An elongate locking channel includes an elongate coupling edge and a J-shaped cross section, with the coupling edge fastened within the second open channel of the coupling member. The second open channel of the coupling member and the coupling edge of the locking channel include correspondingly-shaped cross sections having corners to enable the coupling edge to interlock within the coupling member. The locking channel is configured and dimensioned to interlock around the free edge of the finery case when the cover is placed against a sidewall of the case and further secured relative to the case, to thereby secure the free edge of the cover relative to the free edge of the case. The cover is preferably made of nontransparent, bullet-proof ABS plastic sheets which are hinged together.

20 Claims, 2 Drawing Sheets

APPARATUS AND METHOD FOR FASTENING A SECURITY COVER ONTO A DISPLAY CASE

BACKGROUND OF THE INVENTION

This is a continuation-in-part of U.S. patent application Ser. No. 08/401,275, filed Mar. 9, 1995, entitled "SECURITY COVER FOR JEWELRY CASE".

FIELD OF THE INVENTION

The present invention relates generally to display case covers. More particularly, it concerns an apparatus for securing a protective cover onto a jewelry case, such as a bullet-proof plastic cover.

THE BACKGROUND ART

Jewelers and other merchants of finery are faced with the challenge of displaying their wares without incurring substantial risk of theft. Jewelry is usually displayed in plate-glass jewelry cases designed to maximize visual access to the jewelry by customers. Of course, the more accessible the jewelry, the greater the risk that the jewelry will be stolen. The conventional wisdom in the field of jewelry case security is to fortify the jewelry case against smash and grab type theft without compromising visual access to the jewelry. To this end, armor plated transparent film has been developed which wraps around a jewelry case. The armor plated film inhibits the ability of a thief to break through the jewelry case.

Such protective film, while perhaps effective during business hours, has a number of disadvantages when relied upon for nighttime protection. Although the film is armor plated, it can be penetrated and broken into. The transparent nature of the film preserves visual access for customers, but it also provides an incentive to thieves who have broken into the store after hours to break through the film. Jewelers must often engage in the tedious task of removing the jewelry from the display case every evening and replacing it every morning during the business week. Further, although the film is transparent, it is not removable and usually darkens the case and its contents, which is distracting to sales presentations because it alters the true luster of the jewelry displayed.

It is contemplated in applicant's co-pending parent application first mentioned above to provide a removable jewelry case cover which precludes visual access to the contents of the underlying jewelry case, so as to be more conducive to nighttime protection. The present invention improves upon this concept with an enhanced apparatus and method for securing the cover to the jewelry case.

OBJECTS AND SUMMARY OF THE INVENTION

It is therefore an object of the present invention to provide a removable jewelry case cover having fewer stress points of attachment so as to distribute any stress evenly throughout a contacting length of the cover.

It is an additional object of the invention to provide such a jewelry case cover which is simple in design and manufacture.

It is another object of the invention, in accordance with one aspect thereof, to provide such a jewelry case cover which renders unauthorized disassembly more difficult.

It is a further object of the invention, in accordance with one aspect thereof, to provide such a jewelry case cover which precludes visual access to the contents of the underlying jewelry case and is therefore more conducive to nighttime protection.

The above objects and others not specifically recited are realized in a specific illustrative embodiment of an apparatus for securing a free edge of security cover relative to a free edge of a finery case containing jewelry, precious metals and the like. The apparatus includes an elongate coupling member having first and second open channels formed therein. The free edge of the security cover is fastened within the first open channel. An elongate locking channel includes an elongate coupling edge and a J-shaped cross section, with the coupling edge fastened within the second open channel of the coupling member. The second open channel of the coupling member and the coupling edge of the locking channel include correspondingly-shaped cross sections having corners to enable the coupling edge to interlock within the coupling member. The locking channel is configured and dimensioned to interlock around the free edge of the finery case when the cover is placed against a sidewall of the case and further secured relative to the case, to thereby secure the free edge of the cover relative to the free edge of the case. The cover is preferably made of nontransparent, bullet-proof ABS plastic sheets which are hinged together.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF PRESENTLY PREFERRED EMBODIMENTS

Figure 1:
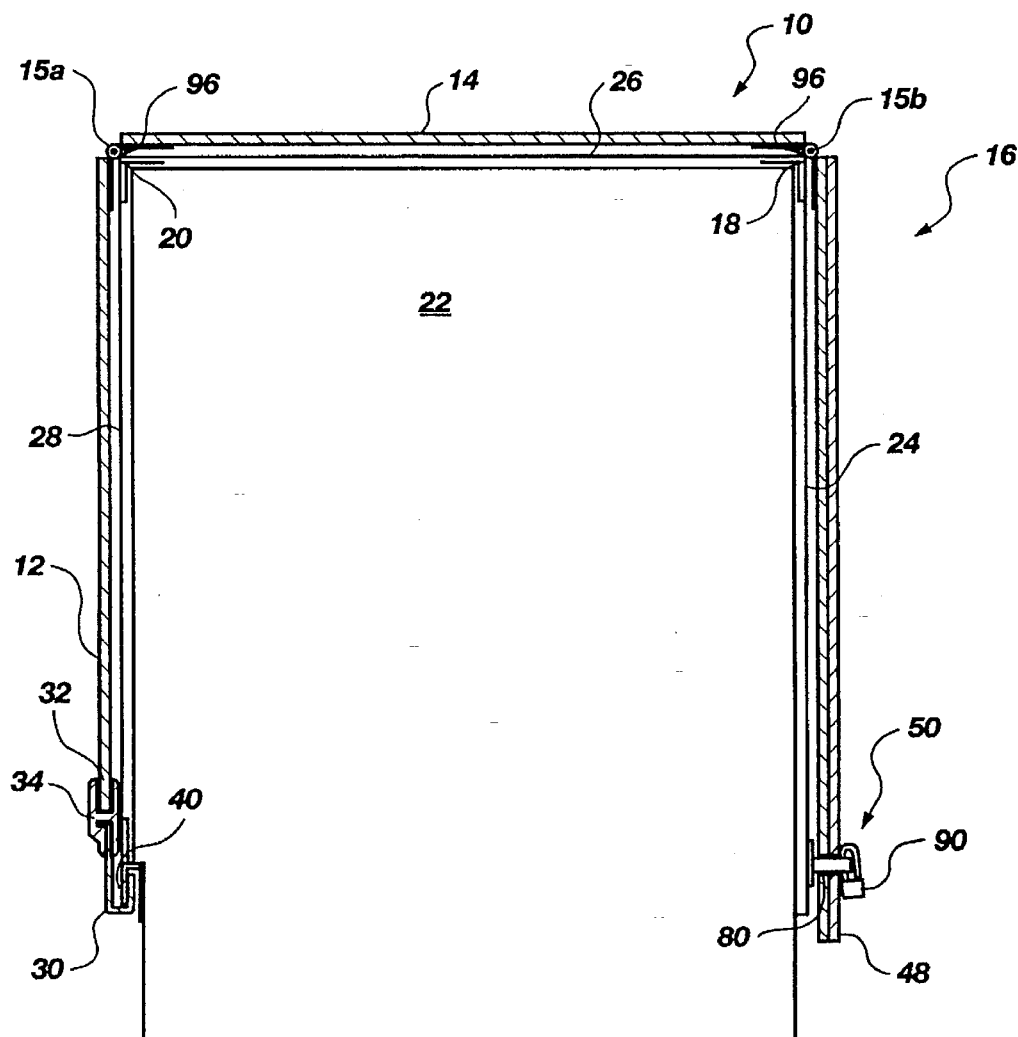
FIG. 1 is a side, cross-sectional view of a security cover secured to a finery case by securing apparatus made in accordance with the principles of the present invention.

For the purposes of promoting an understanding of the principles in accordance with the invention, reference will now be made to the embodiment illustrated in the drawings and specific language will be used to describe the same. It will nevertheless be understood that no limitation of the scope of the invention is thereby intended. Any alterations and further modifications of the illustrated device, and any additional applications of the principles of the invention as illustrated herein, which would normally occur to one skilled in the art and possessed of this disclosure, are to be considered within the scope of the invention claimed.

Referring now to FIG. 1, there is shown a protective security cover, generally designated at 10, made in accordance with the present invention. The cover 10 includes first, second and third hingedly connected sidewalls 12, 14 and 16, respectively, such that the first and third sidewalls 12 and 16 are hingedly attached along two opposing edges of the second sidewall 14 with hinge members 15a–b to form a three-sided cover member. The cover 10 is configured and dimensioned to hingedly extend around first and second edge corners 18 and 20 of a display case, such as a finery case 22, for placement against first, second and third sidewalls 24, 26 and 28 of the case 22. The phrase to "hingedly extend" around something such as an edge corner, as used herein, shall refer to a hinged member which folds around an edge corner with a hinge, as shown in FIG. 1.

The sidewalls 12, 14 and 16 are nontransparent plastic sheets, preferably made from bullet-proof black Lexan™ or equivalent ABS plastic. The adjective "nontransparent" as used herein shall refer broadly to the concept of an object which cannot be seen through with an unaided eye, including the qualities of translucency and opaqueness. The sidewalls 12, 14 and 16 may thus be made from any color of plastic being of sufficient darkness as to be nontransparent. The sidewalls may also be made of clear plastic sheets having an etched finish, wherein the etched finish operates to refract light passing therethrough so as to render said sidewalls nontransparent. The most preferred embodiment includes black plastic sidewalls having an etched finish which is scratch resistent so as to avoid the appearance of wearing over time.

Referring now to FIGS. 1–4, the cover 10 includes first and second opposing free edges 32 and 48, and a preferably J-shaped locking channel 30 disposed along the first free edge 32 opposite the hinge 15a. The locking channel 30 is an elongate member, preferably co-extensive in its length with the free edge 32. One of the principle novelties of the present invention is to secure the locking channel 30 relative to the free edge 32 such that any loads which are passed from one to the other are substantially evenly distributed therebetween, such that stress points of attachment are minimized and substantially eliminated. Applicant has discovered that simply riveting the locking channel 30 directly onto the free edge 32 creates stress points of attachment (weak points) at the rivets, making it easier for the locking channel to be removed from the free edge during an attempted break-in of the finery case 22.

Applicant has addressed this problem by inventing an elongate coupling member 34, which is preferably an ABS plastic extrudate. The elongate coupling member 34 includes first and second open channels 36 and 38 formed therein. The first channel 36 is configured and dimensioned to receive the free edge 32 of the first sidewall 12 thereinto, and the coupling member 34 is preferably solvent bonded to the ABS plastic sidewall 12 in any suitable manner known to those of ordinary skill in the art. The locking channel 30 is then slid into the second open channel 38 of the coupling member 34 so as to interlock therewith as shown in FIG. 1.

The locking channel 30 is configured and dimensioned to interlock around, or other interlockably engage with, a free edge 40 of the case 22 when the cover 10 is placed onto the case and further secured relative to the case as shown by a securing means 50 in FIG. 1, to thereby secure the free edge 32 of the cover 10 relative to the free edge 40 of the case 22. The phrase "interlockably engage" and its various grammatic equivalents shall refer broadly to the element of the locking channel 30 (or its equivalent) being contactably engaged with the free edge 40 (or its equivalent) in any manner so as to secure the free edge 32 of the cover 10 relative to the free edge 40. Accordingly, the locking channel 30, although preferably comprised of a J-shaped cross section, may alternatively comprise any angled member (i.e. having a cross sectional L-shape, V-shape, U-shape or some other cross sectional shape involving an angle) capable of engaging with the free edge 40 in order to secure the free edge 32 relative to the free edge 40. It is noted that the second open channel 38 of the coupling member 34 can be configured and formed to assume many different shapes and angular positions, so as to enable the locking channel 30 of any angled shape to interlockably engage with the free edge 40 of the case 22. The free edge 40 of the case 22 may of course comprise a unibody part of the case, or a separate edge rail which is attached to the case 22, or any equivalent thereof.

It will be appreciated that any force or pressure exerted upon the locking channel 30 or the first sidewall 12 passes through the coupling member 34 without being directionalized through any particular stress point of attachment, because the coupling member 34 operates to intercouple the locking channel 30 and the free edge 32 of the first sidewall 12 along substantially their entire lengths. Stress points of attachment (weak points) are thereby eliminated.

Figures 2, 3:
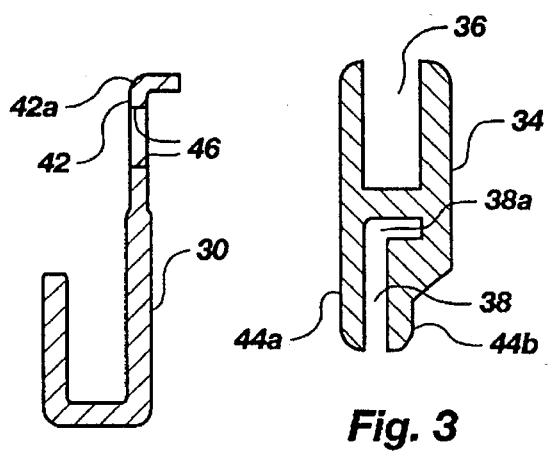
FIG. 2 is a side, cross-sectional view of a J-shaped locking channel of the securing apparatus shown in FIG. 1.
FIG. 3 is a side, cross-sectional view of a coupling member of the securing apparatus shown in FIG. 1.
Figure 4:
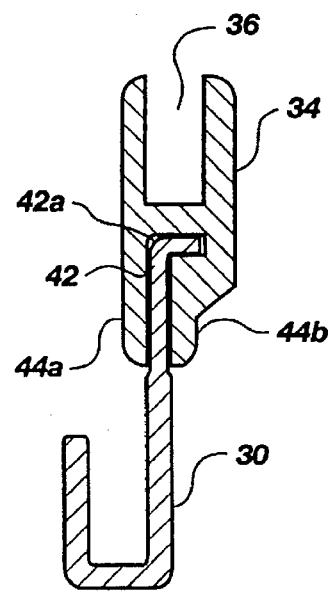
FIG. 4 is a side, cross-sectional view of the locking channel of FIG. 2. and the coupling member of FIG. 3 interlocked together.

The locking channel 30 preferably has a J-shaped cross-section as seen in FIGS. 1–2 and 4, and includes an elongate coupling edge 42 configured and dimensioned to slide into the second open channel 38 of the coupling member 34. More specifically, the second open channel 38 and the coupling edge 42 preferably include correspondingly-shaped cross sections having corners 38a and 42a, respectively, to enable the coupling edge to interlock within the coupling member. The "corners" 38a and 42a refer broadly to any angled configuration or other cooperatively interlockable structure such as tongue and groove and the like.

The respective cross section of the coupling edge 42 and the second open channel 38 are preferably L-shaped as shown in FIGS. 1–4, but any other suitable cross-sectional configuration may be selected in accordance with the principles of the present invention, whether angled or not. Although the cross sections preferably include corners as noted above, such is not required. The second open channel 38 of the coupling member 34 includes opposing ends, at least one of said opposing ends comprising an end opening, to thereby enable the locking channel 30 to slide into said second open channel 38 through said opening.

The locking channel 30 is preferably an aluminum extrudate, although any other suitable material may be used. The respective cross sections of the second open channel 38 and the coupling edge 42 are preferably substantially uniform along their lengths to enable the coupling edge to interlock with the coupling member along substantially its entire length.

First and second fastening means are used to fasten the free edge 32 into the first open channel 36 of the coupling member 34, and to fasten the coupling edge 42 of the locking channel 30 into the second open channel 38, respectively.

Solvent bonding is preferred as the first fastening means for fastening the plastic free edge 32 into the open channel 36 of the plastic coupling member 34. The preferred second fastening means involves ultrasonic welding of opposing sides 44a and 44b of the coupling member 34 together through a slot 46 formed in the locking channel 30. A portion of the coupling member 34 residing adjacent the slot 46 is melted into the slot 46. The portion is configured to be liquified and resolidified so as to flow within the slot 46 and resolidify therein to thereby inhibit the locking channel 30 from sliding out of the coupling member 34. Any desired number of slots 46 and corresponding ultrasonic welds may be made within a given pair of locking channel 30 and coupling member 34. Thus the sides 44a and 44b can be welded together through the slot 46, or alternatively a plastic protrusion can be formed from one of the sides to extend into the slot 46 but without actually welding the sides together.

The cover member 10 is configured and dimensioned for placement onto the finery case 22 in a seated position such that the cover member hingedly extends around the edge corners 18 and 20 to thereby cover the adjacent walls 24, 26 and 28 of the case with the sidewalls 12, 14 and 16. The securing means 50 releasably secures the first sidewall 12 of the cover 10 relative to the finery case 22.

Figure 8:
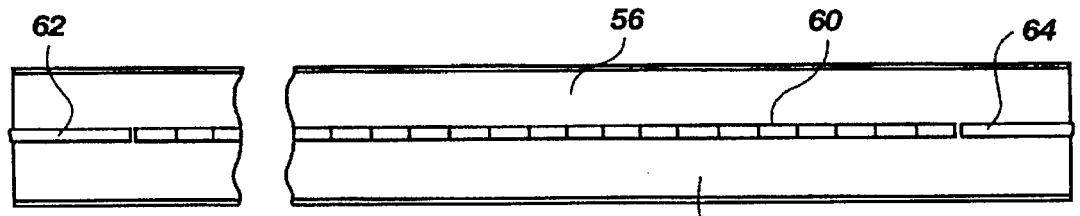
FIG. 8 is a frontal view of a modified hinge member made in accordance with the principles of the present invention.
Figure 9:
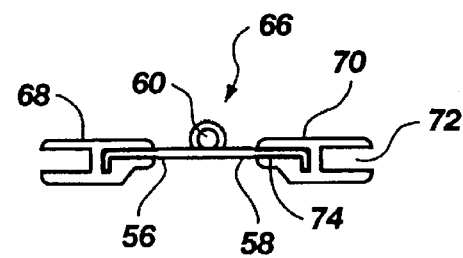
FIG. 9 is a side view of the hinge member of FIG. 8 intercoupled within opposing coupling members of the present invention.

An alternative embodiment of the hinge members 15a–b is shown in FIGS. 8–9 as hinge member 66. The hinge member 66 preferably includes first and second hinge arms 56 and 58 pivotally disposed about a hinge pin 60. The hinge pin 60 includes first and second severed opposing end portions 62 and 64 such that said hinge pin 60 comprises at least a three-piece segmented member. Grasping and removal of an end of the hinge pin 60 results in removal of one of the severed end portions 62 or 64 while the rest of the hinge pin remains lodged within the hinge arms to thereby inhibit disassembly of the hinge member.

Second and third elongate coupling members 68 and 70 are provided for intercoupling the hinge arms 56 and 58 with adjacent edges of a pair of sidewalls of the cover 10. The coupling members 68 and 70 each have first and second open channels 72 and 74 formed therein. The first open channels 72 are configured and dimensioned to respectively receive the adjacent edges of the sidewalls thereinto, and the second open channels 74 are configured and dimensioned to respectively receive the first and second hinge arms 56 and 58 thereinto. Further provided are hinge attachment means for attaching the first and second hinge arms 56 and 58 within the second open channels 74 of the second and third coupling members 68 and 70, respectively, and for attaching the adjacent edges of the sidewalls of the cover 10 within the first open channels 72, respectively. The hinge member 66 may include slots (not shown) formed in the hinge arms 56 and 58, to permit ultrasonic welding to be used as the hinge attachment means, in the same manner described above relating to the slot 46 formed in the locking channel 30. Most preferably, the second open channels 74 of the second and third coupling members 68 and 70, and the hinge arms 56 and 58 of the hinge member 66, include correspondingly-shaped cross sections having corners to enable the hinge arms to respectively interlock within the second and third coupling members. The second and third coupling members 68 and 70 eliminate stress attachment points at the hinged areas of the cover 10 in the same manner discussed above with respect to the coupling member.

One or more of the sidewalls 12, 14 and 16 of the cover 10 preferably includes at least one strand of piano wire 78 or other security wire embedded therein to inhibit cutting of the sidewall with a saw or similar cutting tool. This is accomplished by cutting a groove in the sidewall, placing the wire 78 in the groove, and filling in the groove with ABS cement or other suitable bonding filler. The wire 78 is preferably cut resistant in that it inhibits cutting of the sidewall.

Figure 5:
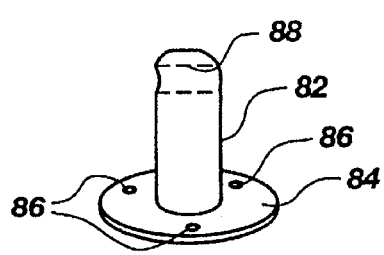
FIG. 5 is a perspective view of a locking projection made in accordance with the principles of the present invention.
Figure 6:
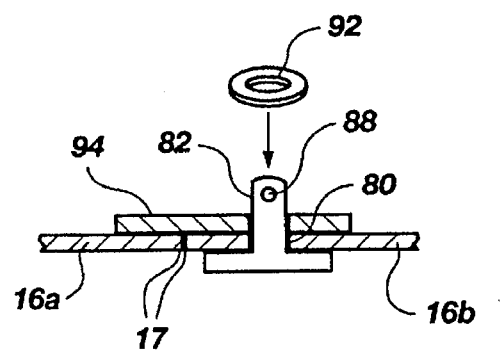
FIG. 6 is a plane, partial cross-sectional view of the locking projection of FIG. 5 shown in conjunction with a portion of the security cover of FIG. 1.

A preferred configuration of the securing means 50 will now be described in reference to FIGS. 1 and 5–6. The third sidewall 16 of the cover member includes an aperture 80 formed therein. A locking projection 82 is attached to one of the walls of the case 22, such as wall 24, and extends outwardly therefrom. The projection 82 includes a base 84 which may be provided with a plurality of screw holes 86 to be used in screwing the projection 82 directly onto the wall 24. The locking projection 82 is positioned and dimensioned to pass through the aperture 80 when the cover 10 resides in its seated position on the case 22. The locking projection 80 further includes an opening 88 configured and dimensioned for receiving a locking means therethrough, such as a padlock 90 (shown in FIG. 1). The padlock 90 or other suitable locking means is configured to extend through the opening 88 of the projection 82 for removably attaching to the projection such that the projection and the padlock 90 are cooperatively wider than the aperture 88 of the third sidewall 16, to thereby secure the third sidewall relative to the security case 22. Any combination of the projection 82 and the padlock 90 (or other suitable locking means) which is larger in at least one dimension than the aperture 88 so as to secure the third sidewall 16 relative to the case 22 is in accordance with the principles of the invention.

The securing means 50 further includes covering means for covering portions of the projection 82 residing between the opening 88 and the case 10 sufficiently to inhibit a cutting member from contacting any of said portions. The covering means comprises, at least in part, the sidewall 16 of the cover 10. The covering means may further include a covering ring 92 (FIG. 6) insertable onto the locking projection 82 so as to rotatably circumscribe the projection between the opening 88 and the cover 10.

Figure 7:
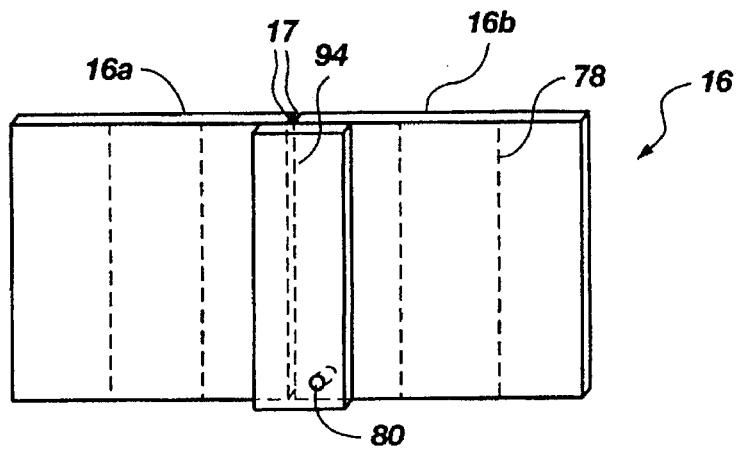
FIG. 7 is a perspective view of a joining plate made in accordance with the principles of the present invention.

Referring now to FIGS. 1 and 7, sidewall 16 of the cover 10 includes adjacent sidewall segments 16a and 16b having abutting edges 17. The sidewall 16 further includes a joining plate 94 overlapping the abutting edges 17 and is secured thereto to form a joint in the sidewall 16. The aperture 80 extends through the joining plate 94 one of the sidewall segments (16b in FIG. 7) such that the covering means comprises, at least in part, the joining plate 94 and said one of said sidewall segments.

In accordance with the principles of the present invention as described above, a preferred method for securing the free edge 32 of the security cover 10 relative to the free edge 40 of the finery case 22, wherein the security cover 10 is configured for placement against a sidewall of the case 22 and for being further secured relative to the case independent of the apparatus (as at 50), comprises the steps of:

(a) forming an elongate coupling member having first and second open channels formed therein, said first channel being configured and dimensioned to receive the free edge of the security cover thereinto;

(b) fastening the free edge of the security cover into the first open channel of the coupling member;

(c) forming an elongate locking channel having an elongate coupling edge and an angle cross section, said coupling edge being configured and dimensioned to slide into the second open channel of the coupling member;

(d) fastening the coupling edge of the locking channel into the second open channel of the coupling member; and (e) interlockably engaging the locking channel with the free edge of the finery case when the cover is placed against the sidewall and further secured relative to the case to thereby secure the free edge of the cover relative to the free edge of the case.

Referring to FIG. 1, the cover 10 is foldable onto itself such that the second sidewall 14 is sandwiched between the remaining sidewalls. The sidewalls are preferably about 0.25 inches thick, or otherwise of a thickness such that the first, second and third sidewalls 12, 14 and 16 are collectively less than one inch thick when folded together.

Padding members 96 are disposed on the hinges 15a–b so as to reside sandwiched between the hinges 15 and the jewelry case 22 when the sidewalls 12, 14 and 16 are covering the walls 24, 26 and 28 of the case. The padding members 44 preferably comprise a VELCRO™ cover, or some other cloth member in the alternative, to prevent the hinges 15a–b from scratching the finery case 22.

The present invention may include any number of hinged sidewalls. For example, only two hinged sidewalls may be suitable to cover a jewelry case having only two adjacent glass panels. Or, a fourth sidewall may be included to hingedly extend around a third edge corner in order to cover an additional wall of the case 22. The sidewalls of the cover 10 may thus embody any suitable shape or number.

Applicant notes that the prior art armor plated film covers fail to solve adequately the problem of displaying jewelry without incurring substantial risk of theft. One of the key features of the present invention is to render the glass panel of a jewelry display case nontransparent with a cover 10 that is substantially free of stress attachment points. The coupling members 34, 68 and 70 help accomplish this. The cover 10 is installed over the case 22 after business hours and removed the next morning. If an unauthorized individual gains access to the jewelry store after business hours, the nontransparent cover 10 introduces doubt into his or her mind as to whether the jewelry cases contain anything at all, and as to which case contains the most valuable finery. By preventing a thief from seeing the contents of a jewelry case, the cover 10 introduces an element of doubt which slows the thief down and buys more time for the authorities to detect the unlawful presence of the thief. The cover 10 snaps on to the case 22 easily and obviates the need for a clerk to handle unload the jewelry case at night, only to reload the case again the next morning.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An apparatus for securing a free edge of a security cover relative to a free edge of a finery case, wherein the security cover is configured for placement against a sidewall of the case and for being further secured relative to the case independent of the apparatus, said apparatus comprising:

an elongate coupling means having first and second open channels formed therein for receiving the free edge of the security cover into the first channel thereof;

first fastening means for fastening the free edge of the security cover into the first open channel of the coupling means;

an elongate locking channel having an elongate coupling edge and an angled cross section, said coupling edge being configured and dimensioned to slide into the second open channel of the coupling means; and second fastening means for fastening the coupling edge of the locking channel into the second open channel of the coupling means;

wherein the locking channel includes at least one slot formed therein, said second fastening means comprising a portion of the coupling means residing adjacent the slot when the locking channel resides within the second open channel of the coupling means, said portion of the coupling means being configured to be liquified and resolidified so as to flow within the slot and resolidify therein to thereby inhibit the locking channel from sliding out of the coupling means.

2. The apparatus as defined in claim 1, wherein the second open channel of the coupling means and the coupling edge of the locking channel include correspondingly-shaped cross sections having corners to enable said coupling edge to interlock within the coupling means.

3. The apparatus as defined in claim 2, wherein the respective cross sections of the second open channel and the coupling edge are substantially uniform along their lengths to enable said coupling edge to interlock with the coupling means along substantially an entire length of said coupling edge.

4. The apparatus as defined in claim 1, wherein the locking channel comprises an aluminum extrudate and wherein the coupling means comprises an ABS plastic extrudate, the locking channel having at least one slot formed therein and portions of the coupling means defining opposing sides of the second open channel being ultrasonically welded together through said at least one slot to thereby inhibit the locking channel from sliding out of the coupling means.

5. The apparatus as defined in claim 1, wherein the second open channel of the coupling means includes opposing ends, at least one of said opposing ends comprising an end opening, to thereby enable the locking channel to slide into said second open channel through said opening.

6. The apparatus as defined in claim 1, wherein the angled cross section of the elongate locking channel comprises a J-shaped cross section.

7. A protective cover for finery cases containing jewelry, precious metals or other finery, wherein said finery cases include a free edge and at least two adjacent walls forming at least one edge corner, said protective cover comprising:

a cover means including at least first and second sidewalls, each sidewall being hingedly attached to an adjacent sidewall, said first and second sidewalls respectively comprising first and second opposing free edges of the cover means, for placing onto a finery case in a seated position such that said cover means hingedly extends around the at least one edge corner of the finery case to thereby cover with said sidewalls the at least two adjacent walls of said finery case forming said at least one edge corner, respectively, so as to inhibit unauthorized entry into the finery case;

securing means for releasably securing the first sidewall of the cover means relative to the finery case when said cover means resides in said seated position;

an elongate coupling member having first and second open channels formed therein, said first channel being configured and dimensioned to receive the second free edge of the cover means thereinto;

first fastening means for fastening the second free edge of the cover means into the first open channel of the coupling member;

an elongate locking channel having an elongate coupling edge configured and dimensioned to slide into the second open channel of the coupling member; and second fastening means for fastening the coupling edge of the locking channel into the second open channel of the coupling member;

wherein the locking channel includes means for interlockably engaging with the free edge of the finery case when the cover means resides in said seated position to thereby secure the second free edge of the cover means relative to the free edge of the case.

8. The protective cover as defined in claim 7, wherein the sidewalls of the cover means are hingedly attached together with a hinge member comprising first and second hinge arms pivotally disposed about a hinge pin, said hinge pin including first and second severed opposing end portions such that said hinge pin comprises at least a three-piece segmented member, such that grasping and removal of an end of the hinge pin results in removal of one of the severed end portions while the rest of the hinge pin remains lodged within the hinge arms to thereby inhibit disassembly of said hinge member.

9. The protective cover as defined in claim 7 further comprising:

an elongate hinge member having first and second pivotally-connected hinge arms, wherein adjacent sidewalls of the cover means include adjacent edges hingedly attached together by said hinge member;

second and third elongate coupling members, wherein said hinge arms are respectively intercoupled with the adjacent edges by said second and third elongate coupling members, said coupling members each having first and second open channels formed therein, the first open channels being configured and dimensioned to respectively receive the adjacent edges of the sidewalls thereinto, and the second open channels being configured and dimensioned to respectively receive the first and second hinge arms thereinto; and hinge attachment means for attaching the first and second hinge arms within the second open channels of the second and third coupling members, respectively, and for attaching the adjacent edges of the first and second sidewalls within the first open channels of said second and third coupling members, respectively.

10. The protective cover as defined in claim 9, wherein the second open channels of the second and third coupling members and the hinge arms of the hinge member include correspondingly-shaped cross sections having corners to enable said hinge arms to respectively interlock within the second and third coupling members.

11. The protective cover as defined in claim 7, wherein at least one of the sidewalls of the cover means includes at least one strand of cut-resistant wire embedded therein to thereby inhibit cutting of said sidewall.

12. The protective cover as defined in claim 7, wherein the first sidewall of the cover means includes an aperture formed therein, the securing means further comprising:

a locking projection attached to one of the walls of the finery case and extending outwardly therefrom, said locking projection being positioned and dimensioned to pass through the aperture of the first sidewall when said cover means resides in said seated position, said locking projection further including an opening configured and dimensioned for receiving a locking means therethrough;

a locking means configured to extend through the opening of the locking projection for removably attaching to said locking projection such that said locking projection and said locking means are cooperatively larger in at least one dimension than the aperture of the first sidewall to thereby secure said first sidewall relative to the finery case; and covering means for covering portions of said projection residing between the opening and the finery case sufficiently to inhibit a cutting member from contacting any of said portions, said covering means comprising, at least in part, the first sidewall of the cover means.

13. The protective cover as defined in claim 12, wherein the first sidewall of the cover means includes adjacent sidewall segments having abutting edges, said first sidewall further including a joining plate overlapping said abutting edges and being secured thereto to form a joint in the first sidewall, wherein the aperture of the first sidewall extends through said joining plate and one of said sidewall segments such that the covering means comprises, at least in part, said joining plate and said one of said sidewall segments.

14. The protective cover as defined in claim 12, wherein the covering means further comprises a covering ring insertable onto the locking projection so as to circumscribe said projection between the opening and the first sidewall of the cover means.

15. The protective cover as defined in claim 7, wherein the cover means is nontransparent.

16. The protective cover as defined in claim 7, wherein the angled cross section of the elongate locking channel comprises a J-shaped cross section which is configured and dimensioned to interlock around the free edge of the finery case.

17. The protective cover as defined in claim 7, wherein the second open channel of the coupling member and the coupling edge of the locking channel include correspondingly-shaped cross sections having corners to enable said coupling edge to interlock within the coupling member.

18. The protective cover as defined in claim 17, wherein the respective cross sections of the second open channel and the coupling edge are substantially uniform along their lengths to enable said coupling edge to interlock with the coupling member along substantially an entire length of said coupling edge.

19. The protective cover as defined in claim 7, wherein the locking channel includes at least one slot formed therein, said second fastening means comprising a portion of the coupling member residing adjacent the slot when the locking channel resides within the second open channel of the coupling member, said portion of the coupling member being configured to be liquified and resolidified so as to flow within the slot and resolidify therein to thereby inhibit the locking channel from sliding out of the coupling member.

20. A method for securing a free edge of a security cover relative to a free edge of a finery case, wherein the security cover is configured for placement against a sidewall of the case and for being further secured relative to the case, said method comprising the steps of:

(a) forming an elongate coupling member having first and second open channels formed therein, said first channel being configured and dimensioned to receive the free edge of the security cover thereinto;

(b) fastening the free edge of the security cover into the first open channel of the coupling member;

(c) forming an elongate locking channel having an elongate coupling edge and an angled cross section, said coupling edge being configured and dimensioned to slide into the second open channel of the coupling member;

(d) fastening the coupling edge of the locking channel into the second open channel of the coupling member; and (e) interlockably engaging the locking channel with the free edge of the finery case when the cover is placed against the sidewall and further secured relative to the case to thereby secure the free edge of the cover relative to the free edge of the case.

* * * * *